US012523456B2

(12) United States Patent
Porter et al.

(10) Patent No.: US 12,523,456 B2
(45) Date of Patent: Jan. 13, 2026

(54) DEVICE, SYSTEM, AND METHOD FOR TRANSPORT AND ACTIVATION OF A TWO-PART EXPLOSIVE

(71) Applicants: Schyler Porter, Collinston, UT (US); William Nixon, III, Marion, AR (US)

(72) Inventors: Schyler Porter, Collinston, UT (US); William Nixon, III, Marion, AR (US)

( * ) Notice: Subject to any disclaimer, the term of this patent is extended or adjusted under 35 U.S.C. 154(b) by 2 days.

(21) Appl. No.: 18/430,597

(22) Filed: Feb. 1, 2024

(65) Prior Publication Data

US 2025/0012550 A1 Jan. 9, 2025

Related U.S. Application Data

(60) Provisional application No. 63/482,968, filed on Feb. 2, 2023.

(51) Int. Cl.

| | |
|---|---|
| ***F42B 25/00*** | (2006.01) |
| ***B64U 10/14*** | (2023.01) |
| ***B64U 60/00*** | (2023.01) |
| *B64U 101/18* | (2023.01) |

(52) U.S. Cl.

CPC .............. *F42B 25/00* (2013.01); *B64U 10/14* (2023.01); *B64U 60/00* (2023.01); *B64U 2101/18* (2023.01)

(58) Field of Classification Search

CPC . F42B 27/00; F42B 3/00; B64U 60/00; B64U 10/14; B64U 2101/18; B64U 2101/00; C06C 9/00

See application file for complete search history.

(56) References Cited

U.S. PATENT DOCUMENTS 3,249,477 A * 5/1966 Clay ........................ C06B 47/14 149/43
3,338,165 A * 8/1967 Joseph .................... C06B 25/36 149/94
3,713,915 A * 1/1973 Fast ........................ C06B 25/36 149/91
H778 H * 5/1990 Carlton .......................... 502/154
(Continued)

FOREIGN PATENT DOCUMENTS

CN 113124710 A * 7/2021 ............ B01F 27/191
CN 115143848 A * 10/2022
(Continued)

*Primary Examiner* — Benjamin P Lee

(57) ABSTRACT

A system for delivering and activating a two-part explosive may include an unmanned vehicle and/or an elevated structure, and a two-part explosive device. The device may include a container that is attached to, and releasable from, the unmanned vehicle or elevated structure. The container may contain an unsensitized explosive enclosed in a casing and and a sensitizing agent adjacent to the casing. The device may include an opening mechanism positioned at least partially within the container and adjacent to the casing. The opening mechanism may open the casing and expose the unsensitized explosive to the sensitizing agent, forming the two-part explosive in response to the container being released from the unmanned vehicle or elevated structure. The device may include a detonator inside or attached to the container. The detonator may trigger ignition of the two-part explosive after the unsensitized explosive is exposed to the sensitizing agent.

20 Claims, 13 Drawing Sheets

(56) References Cited

U.S. PATENT DOCUMENTS

| | | | | |
|---|---|---|---|---|
| 7,472,652 | B1 * | 1/2009 | Scheid | F42D 1/043<br>102/314 |
| 11,506,465 | B1 * | 11/2022 | Foltz | F42D 1/043 |
| 11,840,339 | B2 * | 12/2023 | Sly | F42D 3/00 |
| 12,006,038 | B2 * | 6/2024 | Knab | B64C 39/024 |
| 2018/0038676 | A1 * | 2/2018 | Ahrens | F42B 3/003 |
| 2020/0183396 | A1 * | 6/2020 | Gibert | B64U 10/80 |
| 2022/0212791 | A1 * | 7/2022 | Knab | F42D 3/00 |
| 2022/0274705 | A1 * | 9/2022 | Sly | B64D 1/04 |
| 2024/0409246 | A1 * | 12/2024 | Van Der Jagt | B64U 10/14 |

FOREIGN PATENT DOCUMENTS

| | | | | |
|---|---|---|---|---|
| EP | 1707547 | A2 * | 10/2006 | C06B 33/08 |
| EP | 3489138 | A1 * | 5/2019 | |
| FR | 2988389 | A1 * | 9/2013 | C06B 33/06 |
| WO | WO-2012035215 | A1 * | 3/2021 | F42C 13/023 |

* cited by examiner

FIG. 1A
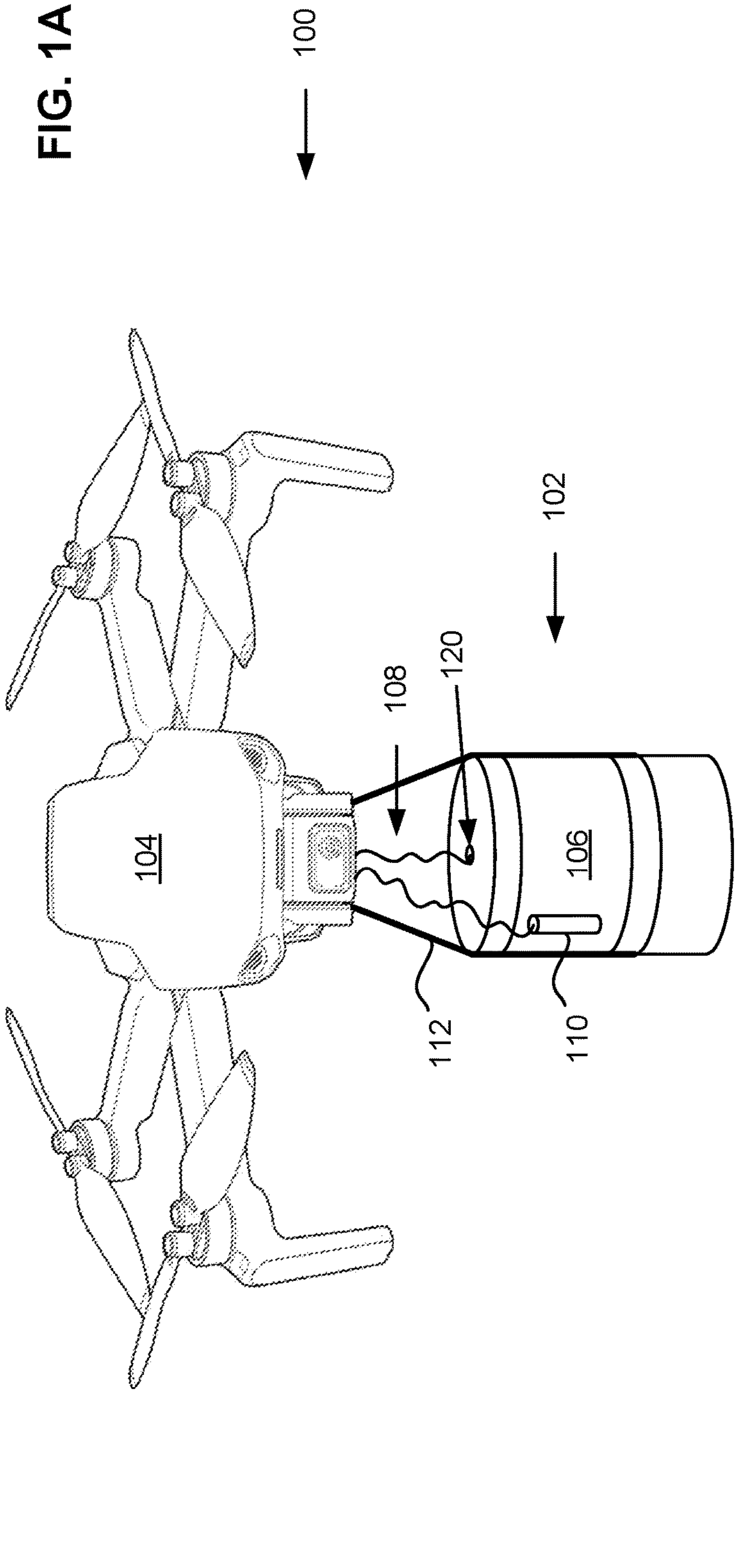
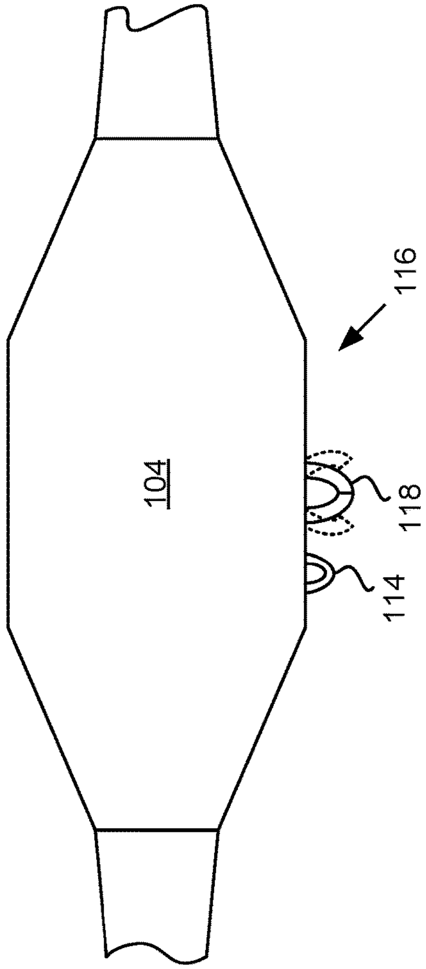
FIG. 1B

FIG. 2A
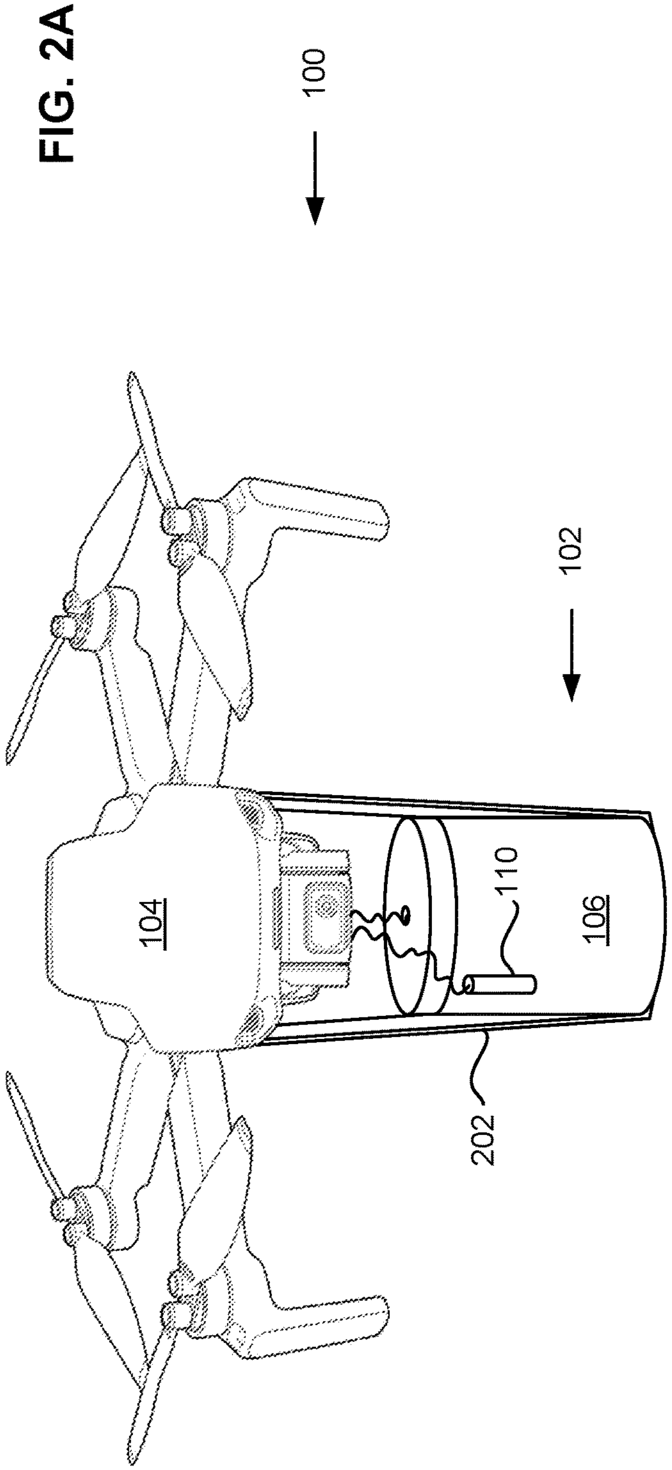
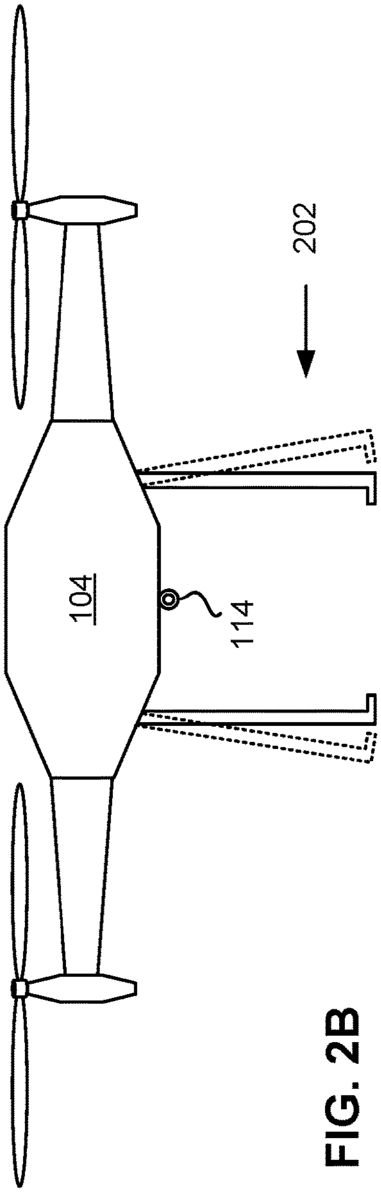
FIG. 2B

DEVICE, SYSTEM, AND METHOD FOR TRANSPORT AND ACTIVATION OF A TWO-PART EXPLOSIVE

CROSS-REFERENCES

This application claims priority to U.S. Provisional Patent Application No. 63/482,968 entitled "DEVICE, SYSTEM, AND METHOD FOR TRANSPORT AND ACTIVATION OF A TWO-PART EXPLOSIVE," filed Feb. 2, 2023 by Schyler Porter and William Nixon, III, which application is incorporated herein by reference in its entirety.

BACKGROUND

In the field of explosives and explosives manufacturing, there are many types of explosives made for various applications. A few of these applications are for mining, construction, demolition, law enforcement and military uses. There are a multitude of explosive products available to satisfy the requirements in these fields. Such are described at length in U.S. Pat. No. 6,960,267 to William P. Nixon, III, issued Nov. 1, 2005, and the entirety of which is incorporated herein by reference. In particular, the '267 patent describes the benefits of two-part explosives and the various applications thereof.

SUMMARY

In some aspects, the techniques described herein relate to a system that delivers and combines a two-part high explosive. The system may include an unmanned vehicle and a two-part explosive device. The two-part explosive device may include a container that contains an unsensitized explosive and a sensitizing agent. The container may be attached to, and releasable from, the unmanned vehicle. The unsensitized explosive may be enclosed in a casing, and the sensitizing agent may be positioned adjacent to the casing. The two-part explosive device may further include an opening mechanism and a detonator. The opening mechanism may be positioned at least partially within the container and adjacent to the casing to open the casing and expose the unsensitized explosive to the sensitizing agent. The opening mechanism may open the casing in response to the container being released from the unmanned vehicle. The detonator may be inside or attached to the container and may trigger ignition of the two-part explosive after the unsensitized explosive is exposed to the sensitizing agent.

In various implementations, the system may include an elevated structure from which the two-part explosive device and/or the unmanned vehicle is deployed. For example, the two-part explosive device may be dropped, launched, and/or thrown from a tower towards a ground target. The unmanned vehicle may be launched, with the two-part explosive device, from the elevated structure.

The unsensitized explosive may include nitromethane and the sensitizing agent may include a cellulose, amine, or metal powder product. The sensitizing agent may surround the casing. In various implementations, the sensitizing agent may form a cylinder with a hollow center, and the casing may be positioned in the hollow center.

The opening mechanism may include a line such as a string, wire, cable, or polymer line. A first portion or a first end of the opening mechanism may be attached to the casing such that, as a tension is applied to the line, the line causes the casing to tear, burst, or otherwise open. The line may extend from inside the container through an opening in the container to the unmanned vehicle. A second end of the line may be attached to the unmanned vehicle or elevated structure. As the container is attached to the unmanned vehicle or elevated structure, there may be slack in the line.

In various implementations, the casing may include a pull-strip. The opening mechanism may include a line attached at a first end to the pull-strip. The line may extend from inside the container through an opening in the container and to the unmanned vehicle. A second end of the line may be attached to the unmanned vehicle. As the container is attached to the unmanned vehicle, there may be slack in the line.

The casing may include a removable lid. The opening mechanism may include a line attached to the removable lid. The line may extend from inside the container through an opening in the container and to the unmanned vehicle. A second end of the line may be attached to the unmanned vehicle. As the container is attached to the unmanned vehicle, there may be slack in the line.

In some implementations, the opening mechanism including a spring-loaded pin positioned such that, as the spring-loaded pin deploys, it punctures or cuts the casing, wherein the spring-loaded pin is deployed in response to the container being released from the unmanned vehicle.

The detonator may include one or more of a chemical, mechanical, and electrical blasting cap. The detonator may include a fuse, wherein the fuse includes one or more of a pyrotechnic fuse, an electric match, a slapper, and a bridgewire.

In some aspects, the techniques described herein relate to a device for combining a two-part high explosive. The device may include: a biodegradable container that contains a volume of nitromethane enclosed in a polymer casing and a volume of cellulose at least partially surrounding the nitromethane. The device may include a line attached to the polymer casing and extending from inside the container to outside the container. The line may be attached to the casing such that a tensioning force applied to the line causes the casing to open. The device may include a detonator inside or attached to the container. The detonator may trigger ignition of the two-part explosive after the nitromethane is exposed to the cellulose.

The polymer casing may be attached to an inside surface of the biodegradable container. The line may be wrapped around the polymer casing such that the tensioning force causes the line to tighten around the polymer casing. The polymer casing may include a flexible wall that defines an inner cavity, wherein the flexible wall has a thickness in a range of 0.5 mils to 5 mils. The cellulose may include one or more sheets of dried pulpwood having a thickness in a range from 0.5 mils to 20 mils. In various implementations, a ratio of the volume of nitromethane to the volume of cellulose may be in a range from 1:1 to 1:4.

In some aspects, the techniques described herein relate to a method of delivering and combining a two-part high explosive. The method may include attaching a two-part explosive device to an unmanned aerial vehicle (UAV). The two-part explosive device may include a container that contains the two-part high explosive. The container may be attached to, and releasable from, the UAV. The two-part explosive may include: an unsensitized explosive enclosed in a casing and a sensitizing agent adjacent to the casing. The two-part explosive device may include an opening mechanism adjacent or attached to the casing, and a detonator inside or attached to the container. The method may include launching the UAV and directing it, by remote control or automatically, to an area above a ground target; hovering the UAV over the ground target; releasing the two-part explosive device from the UAV; after releasing the two-part explosive device from the UAV, triggering the opening mechanism to open the casing and expose the unsensitized explosive to the sensitizing agent; and activating the detonator after the unsensitized explosive is exposed to the sensitizing agent.

Releasing the two-part explosive device from the UAV may, in some implementations, automatically trigger the opening mechanism. The detonator may include a delay mechanism that is activated after releasing the two-part explosive device from the UAV. The delay mechanism may delay activation of the detonator for a set period of time, until the two-part explosive device falls to a specified height above the ground target, and/or or until the two-part explosive device impacts with the ground target.

BRIEF DESCRIPTION OF THE DRAWINGS

The present description will be understood more fully when viewed in conjunction with the accompanying drawings of various examples of devices, systems, and methods for transporting and activating a two-part explosive. The description is not meant to limit the devices, systems, and methods for transporting and activating a two-part explosive to the specific examples. Rather, the specific examples depicted and described are provided for explanation and understanding of devices, systems, and methods for transporting and activating a two-part explosive. Throughout the description the drawings may be referred to as drawings, figures, and/or FIGs.

FIGS. 1A-B illustrate an implementation of a system for transporting and activating a two-part explosive device using an unmanned vehicle.

FIGS. 2A-B illustrate another implementation of the system for transporting and activating the two-part explosive device where the unmanned vehicle includes arms for carrying and releasing the two-part explosive device.

FIGS. 4A-4E illustrate an example delivery sequence for the two-part explosive device.

DETAILED DESCRIPTION

Figure 3:
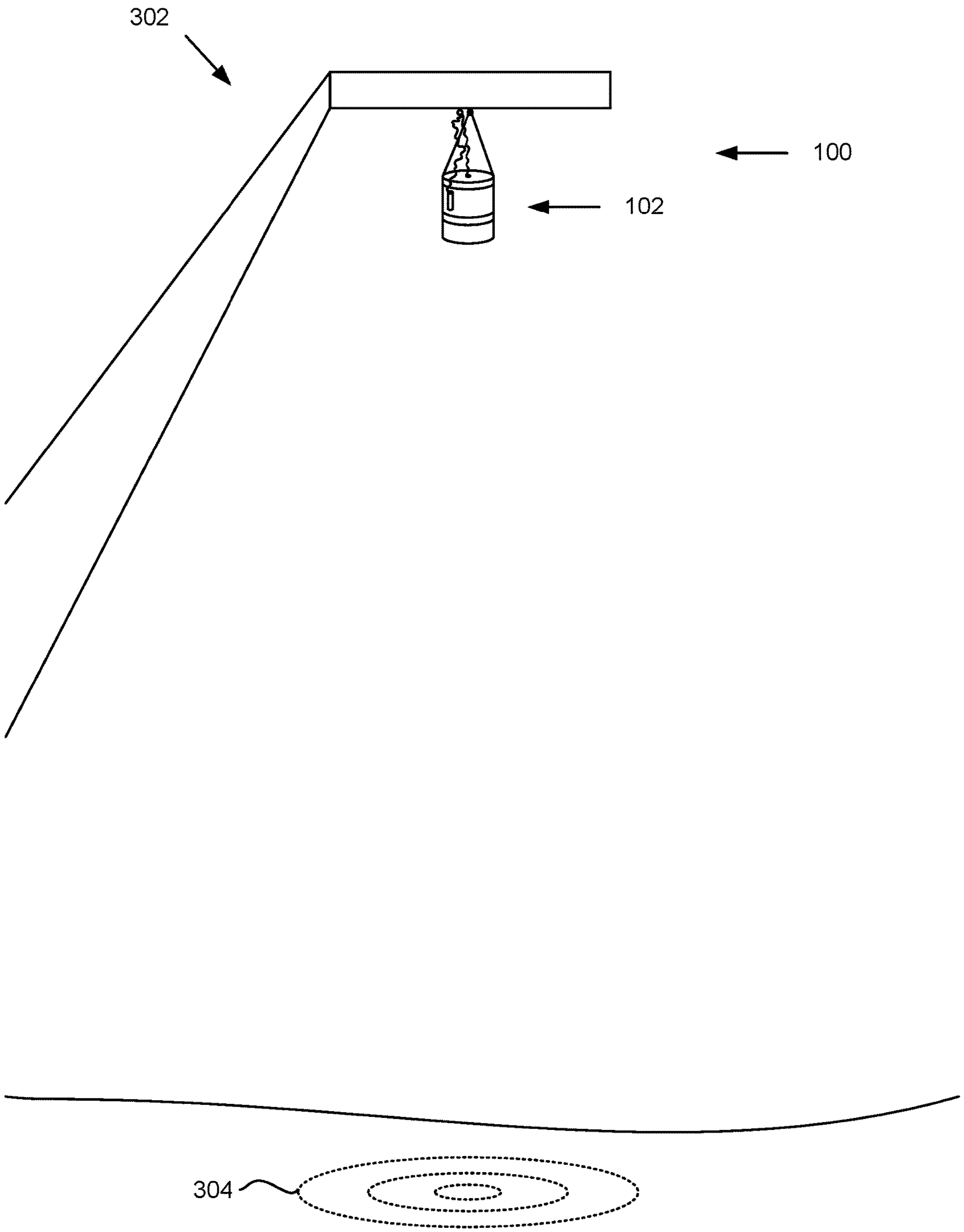
FIG. 3 illustrates an implementation of the system using an elevated structure to deploy and activate the two-part explosive device.

Devices, systems, and methods for transporting and activating a two-part explosive as disclosed herein will become better understood through a review of the following detailed description in conjunction with the figures. The detailed description and figures provide merely examples of the various embodiments of devices, systems, and methods for transporting and activating a two-part explosive. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

A conventional two-part explosive may include an unsensitized explosive compound and a sensitizer. Though typically flammable, an unsensitized explosive compound requires the addition of the sensitizer to become highly explosive. For example, liquid nitromethane is an unsensitized liquid explosive that, when combined with a sensitizer such as aluminum powder, cellulose, or an amine compound becomes highly explosive when triggered by a relatively small burst of energy, such as by detonating a blasting cap.

After mixing the unsensitized explosive compound with the sensitizer, the high explosive becomes significantly more dangerous to handle and transport. Specifically, people handling high explosives risk substantial injury or death, and there is significant risk of property damage. As such, government regulators typically place hefty restrictions on the transport of these materials. Safety concerns and regulations make it significantly more expensive to handle, transport, and use explosives. Additionally, many two-part explosives are made of materials such as plastic and metal that preserve the active compounds of the explosive and can be harsh on the environment. Because such devices do not readily degrade, retrieving unexploded ordinance can be dangerous. Such unexploded ordinance may not be discovered and may thus present a serious danger to unaware passers-by.

The devices, systems, and methods described herein increase the overall safety associated with using high explosives. In turn, the improved safety helps avoid various regulations associated with the transportation, handling, and use of high explosives. Because the unsensitized explosive and the sensitizing agent remain unmixed until the explosive is released at or above the target, handlers avoid the risks associated with handling and transporting high explosives. Property, such as containers, storage facilities, and transportation vehicles are also protected from damage or destruction. Additionally, the devices described herein may be made in whole or in part with environmentally-friendly materials. Thus, should such devices fail to explode when desired, they will eventually degrade and/or decompose. This protects not only the environment, but also makes it safer to retrieve unexploded ordinance, or even to leave unexploded ordinance where it lies.

Two-part explosives have a variety of applications in a variety of industries, such as mining, construction, demolition, and avalanche control. In many parts of the world, avalanches present an extreme danger to people and infrastructure in mountainous regions where heavy snowfall occurs. As snowfall accumulates on the steep sides of the mountains over a period of days or weeks, the danger of an avalanche occurring increases. It is not presently possible to predict the exact time that an avalanche will happen naturally.

Since it is not presently possible to prevent avalanches from occurring, many techniques have been developed and employed to trigger an avalanche at a specific time when the possibility of threat to life and property can be minimized. These methods can also be used to initiate more frequent and smaller avalanches which are less dangerous. Most of the techniques utilized to initiate “controlled” avalanches employ various types of explosives to create shockwaves in the air above or from within an unstable snowpack.

For example, in recreational ski areas, the skiers are not allowed to be on the slopes until the known avalanche areas are inspected and, if needed, explosives are deployed to trigger avalanches. A second similar example is a situation where a potential avalanche danger is above a road or highway on a mountainside. Here, traffic can be stopped at a safe distance from an avalanche-prone area. Snow removal equipment may be prepositioned to clear the highway after the controlled avalanche has occurred.

There are many of types of explosives used for initiating avalanches, such as dynamite, watergels, emulsions, cast boosters, ANFO, detonating cords, and artillery shells. Explosions can also be made by devices using various gases such as oxygen and propane. Many times, the choice of explosive depends on availability in the area. Since avalanches occur in mountainous and rocky terrain, it is also common that mining and construction operations are located nearby.

The delivery of the explosive charges to the potential avalanche site varies depending on several factors. They can be delivered to the sites by members of the ski patrol and hand-placed. The initiation of the explosives may be accomplished by the use of a time fuse (also called a safety fuse) and detonator assembly. The fuse may be lit by means of a pull string igniter. After the fuse is lit, the explosive charge may detonate at a predetermined time, such as two to six minutes later. The time to detonation may be dependent on the length of the fuse. Helicopters are also used to drop the charges in the desired location.

Another common method to deliver the explosive is by means of a projectile fired from an air cannon. These have a simple firing mechanism which causes the projectile to detonate upon impact. Similarly, actual military artillery cannons (e.g., Howitzers) are fired from set positions. These work especially well for inaccessible targets because of their range and accuracy. Lastly, built in place towers may be used to hold explosive charges. The charges may be set beforehand and fired remotely.

FIGS. 1A-B illustrate an implementation of a system 100 for transporting and activating a two-part explosive device 102 using an unmanned vehicle 104. 1. During transportation, the two-part explosive device 102 may be inactive, i.e., the active components of the two-part explosive device 102 are unmixed. The two-part explosive device 102 may include a container 106, an opening mechanism 108, and a detonator 110. The two-part explosive device 102 may be attached to or supported by the unmanned vehicle 104 by an attachment mechanism 112.

The container 106 may contain the active components of the two-part explosive device 102. The container 106 may be attached to, and releasable from, the unmanned vehicle 104. For example, the attachment mechanism 112 may be a strap that wraps around the container and attaches to an underside of the unmanned vehicle 104. The unmanned vehicle 104 may include various attachment points 114 on an underside 116 of the unmanned vehicle 104. One such attachment point may be an actuator 118. The actuator 118 may include arms 202 that, in a closed position, form a loop. The attachment mechanism 112 may be a strap that loops through the actuator 118. The actuator 118 may open automatically or in response to a signal received at the unmanned vehicle 104, such as from a remote control.

The opening mechanism 108 may be positioned at least partially within the container 106 and may extend from the container 106 to the unmanned vehicle 104. For example, the opening mechanism 108 may include a line extending from inside the container 106 through an opening 120 in the container and to the unmanned vehicle 104. As the container 106 remains attached to the unmanned vehicle 104, there may be slack in the line.

The detonator 110 may trigger ignition of the two-part explosive device 102. The detonator 110 be inside or attached to the container 106. The detonator 110 may trigger explosion of the two-part explosive device 102 after the active components have been combined. The detonator 110 may be one or more of a chemical, mechanical, and electrical blasting cap. The detonator 110 may include a fuse, such as one or more of a pyrotechnic fuse, an electric match, a slapper, and a bridgewire. The detonator 110 may, in some implementations, be attached to the unmanned vehicle 104 at one of the various attachment points 114. For example, the detonator may include a switch initially in an off position. The switch may be coupled to the unmanned vehicle 104 by, for example, a string or wire. A sudden tension in the string or wire may trigger the detonator.

Although presently illustrated as an unmanned aerial vehicle (UAV), the unmanned vehicle 104 may, in other implementations, be any of a variety of vehicles. For example, in some implementations, the unmanned vehicle 104 may be a wheeled or tracked vehicle. The unmanned vehicle 104 may be a glider or balloon. The unmanned vehicle 104 may be a water-borne vehicle such as a boat or a submarine. In some implementations, the two-part explosive device 102 may be carried by a manned vehicle such as a wheeled vehicle, a tracked vehicle, an aircraft, or a watercraft.

FIGS. 2A-B illustrate another implementation of the system 100 where the unmanned vehicle 104 includes arms 202 for carrying and releasing the two-part explosive device 102. The arms 202 may extend to an underside of the two-part explosive device 102 and/or may clamp onto sides of the two-part explosive device 102.

FIG. 3 illustrates an implementation of the system using an elevated structure 302 to deploy and activate the two-part explosive device. The elevated structure 302 may include various attachment points similar to the attachment points 114 on the unmanned vehicle 104. Similarly, one such attachment point may be an actuator like the actuator 118. The actuator on the elevated structure 302 may open automatically or in response to a signal, such as from a remote control. The two-part explosive device 102 may be attached to the elevated structure 302 at one or more of the attachment points and/or actuator, such as by the attachment mechanism 112. The opening mechanism 108 and/or the detonator 110 may similarly be attached to the elevated structure 302.

The elevated structure 302 may, in some implementations, include a launching device such as a thrower, launcher, or canon. The two-part explosive device 102 may be deployed from the elevated structure 302 by launching it from the elevated structure 302. The opening mechanism 108 and/or the detonator 110 may be triggered by the launch. For example, the opening mechanism 108 may include a line attached to the elevated structure 302 and/or the launching device. There may be sufficient slack in the line to activate the opener after the two-part explosive device 102 has traveled a distance from the elevated structure 302.

Figure 4A:
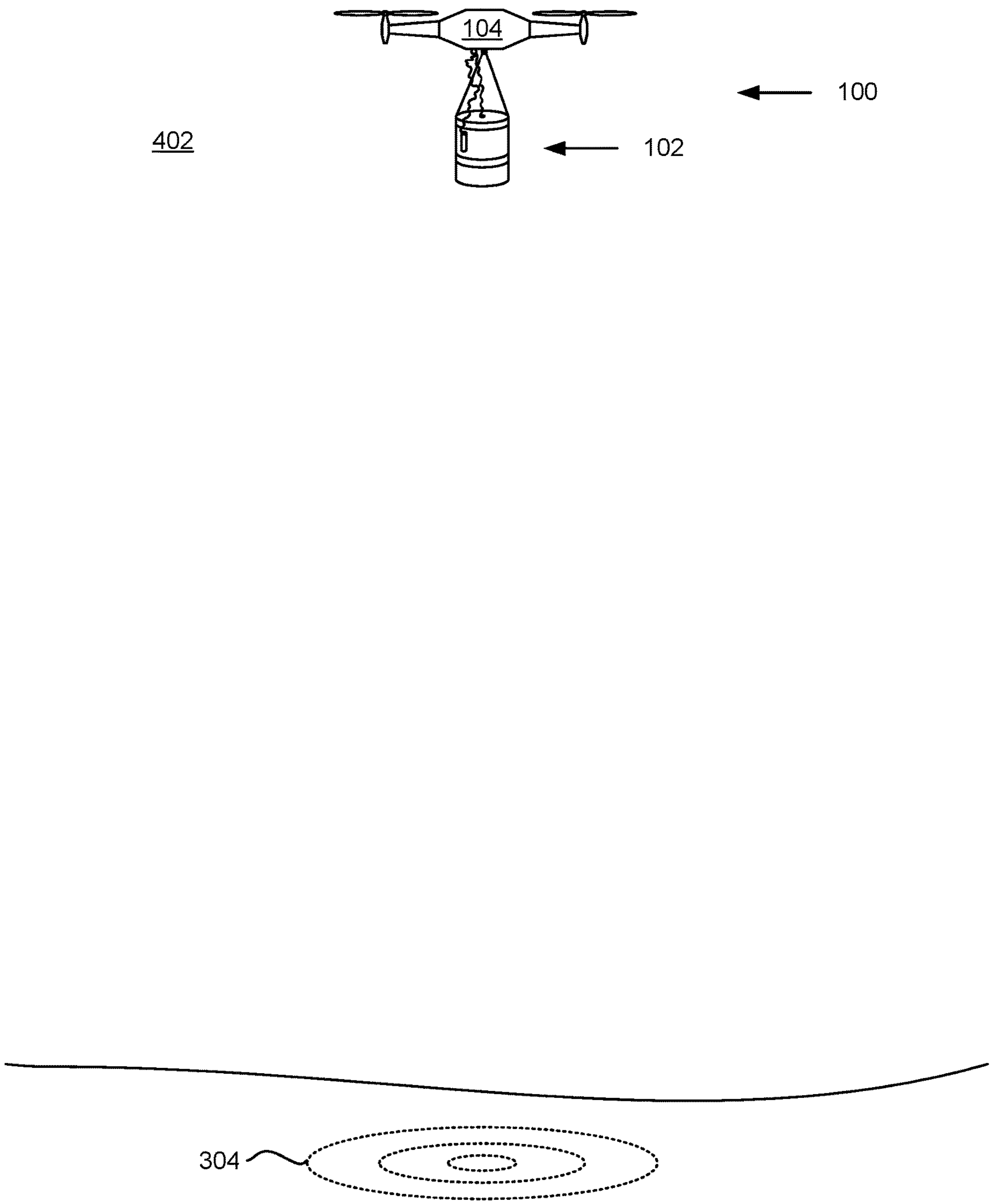
Figure 3E:
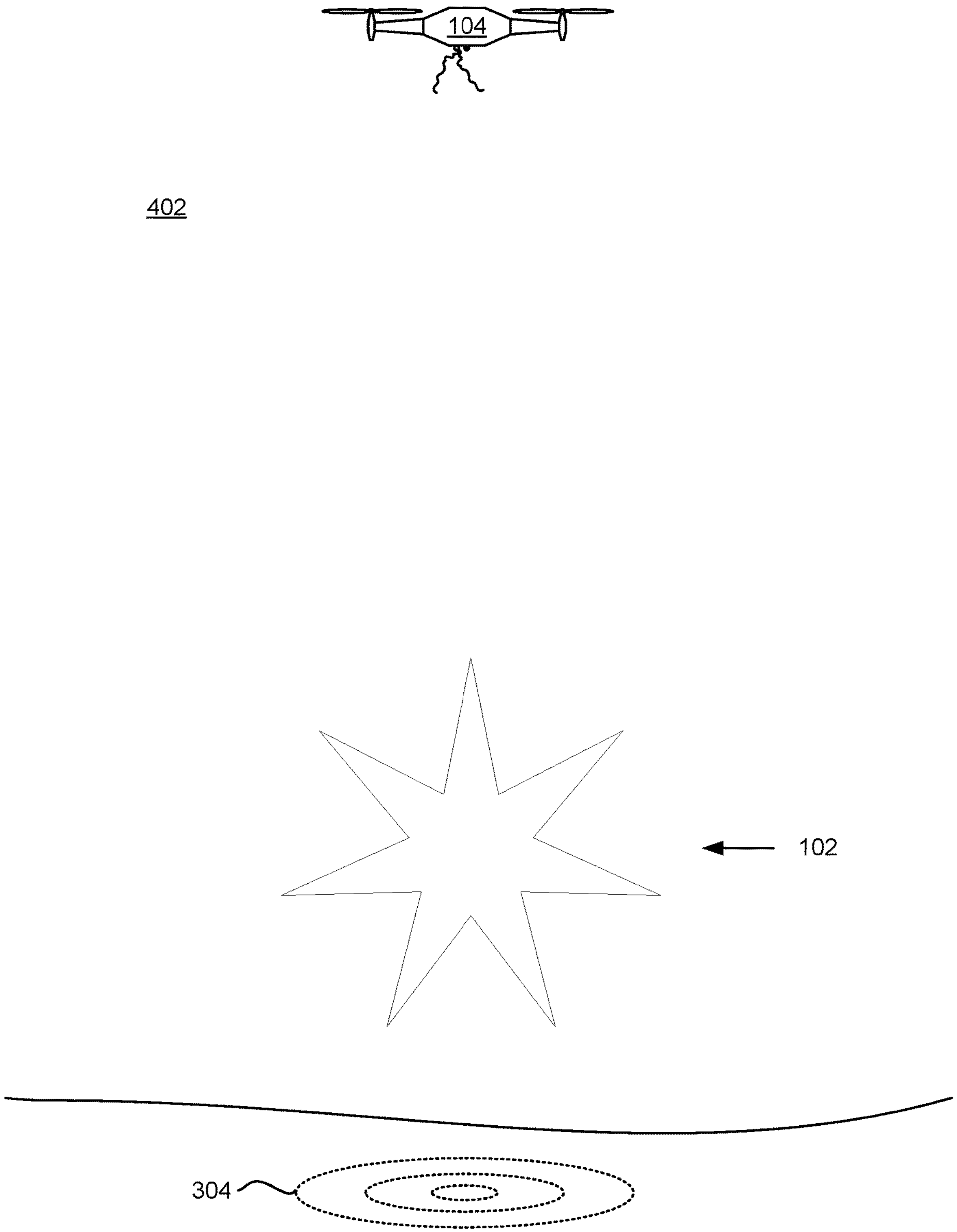

FIGS. 4A-3E illustrate an example delivery sequence for the two-part explosive device 102. As shown in FIG. 4A, the unmanned vehicle 104 may transport the two-part explosive device 102 to an air space 402 above a target 404. In various implementations, the unmanned vehicle 104 may hover over the target 404. In some implementations, the unmanned vehicle 104 may travel continuously towards, over, and then past the target 404.

The opening mechanism 108 may extend from the two-part explosive device 102 and be attached to the underside 116 of the unmanned vehicle 104. The detonator 110 may similarly be attached to one of the various attachment points 114 on the underside 116 of the unmanned vehicle 104. Such attachment may, when forcefully severed, trigger the respective devices. Both connections from the two-part explosive device 102 to the unmanned vehicle 104 may have slack. There may be more slack in the connection with the detonator 110 than in the connection with the opening mechanism 108 so that the opening mechanism 108 triggers before the detonator 110. The lengths of the respective connections may, in some implementations, correspond to a free fall distance before the two-part explosive device 102 explodes. The lengths may correspond to a distance from the unmanned vehicle 104 before the two-part explosive device 102 explodes.

Figure 4B:
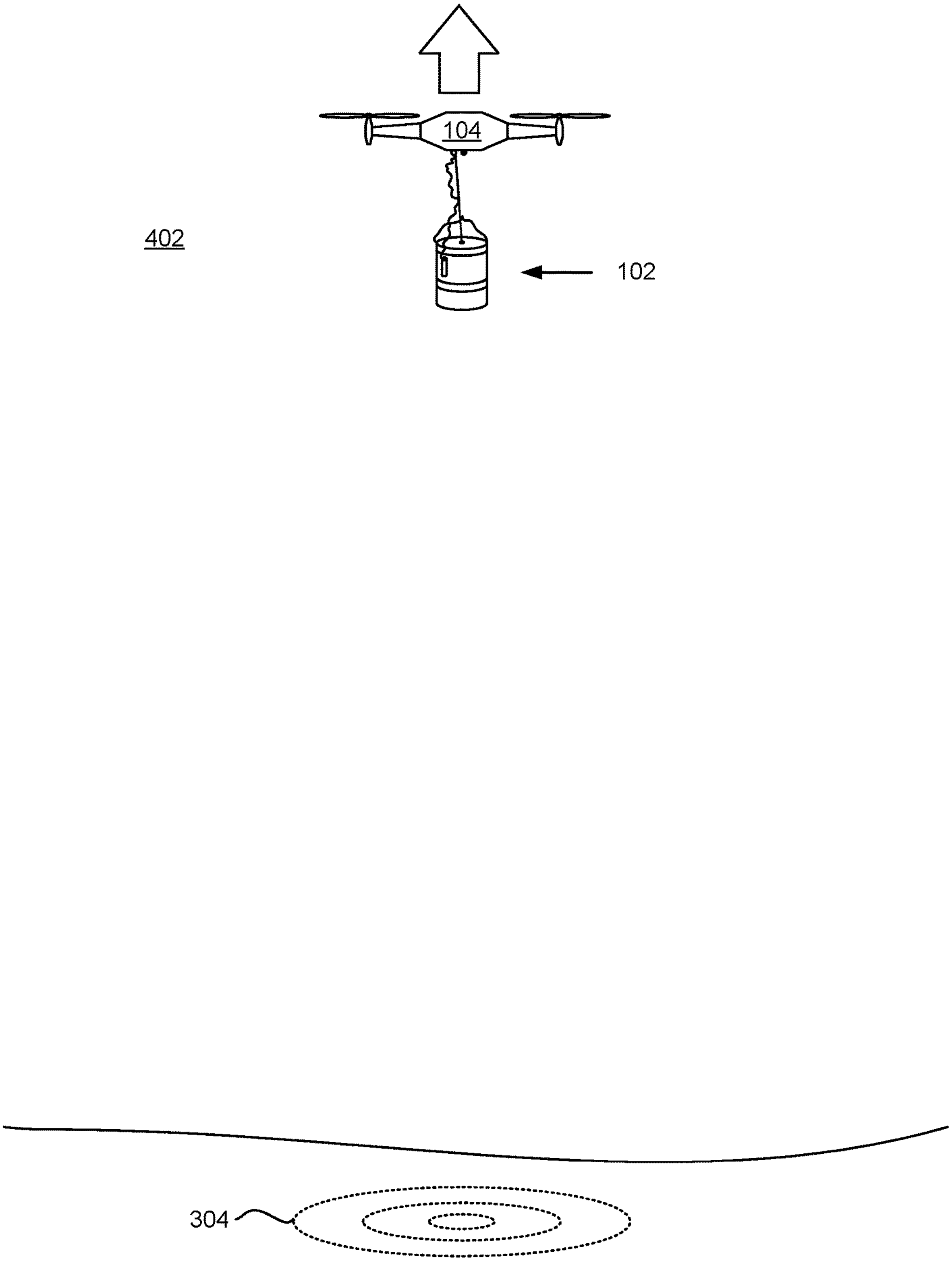

As shown in FIG. 4B, the two-part explosive device 102 may be released from the unmanned vehicle 104. For example, the two-part explosive device 102 may be attached by a strap to the actuator 118 of the unmanned vehicle 104. The actuator 118 may open, releasing the two-part explosive device 102. In some implementations, the two-part explosive device 102 may be supported by the arms 202, which may actuate to release the two-part explosive device 102.

The connection between the opening mechanism 108 and the unmanned vehicle 104 may become taut, such as due to the release of the two-part explosive device 102 or a sudden increase in upward thrust of the unmanned vehicle 104.

Figure 4C:
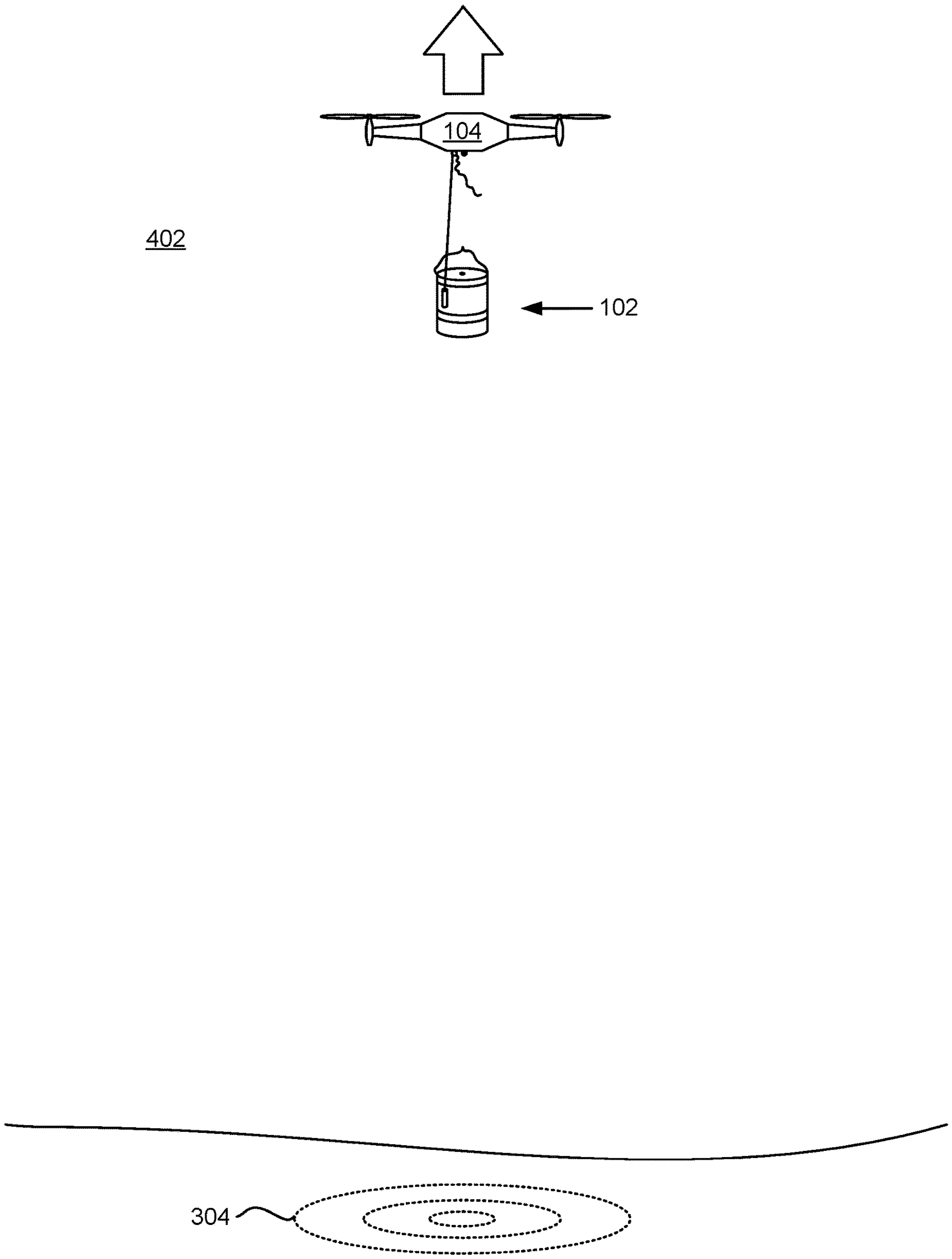

As shown in FIG. 4C, the tension in the connection between the opening mechanism 108 and the unmanned vehicle 104 may cause the connection to sever. In some implementations, the opening mechanism 108 may be a string, cable, wire, or line, such as fishing line. The opening mechanism 108 may break or may be pulled away from the two-part explosive device 102, which may trigger mixing of the active components inside the two-part explosive device 102. After the opening mechanism 108 is triggered, the connection between the detonator 110 and the unmanned vehicle 104 may become taut.

Figure 4D:
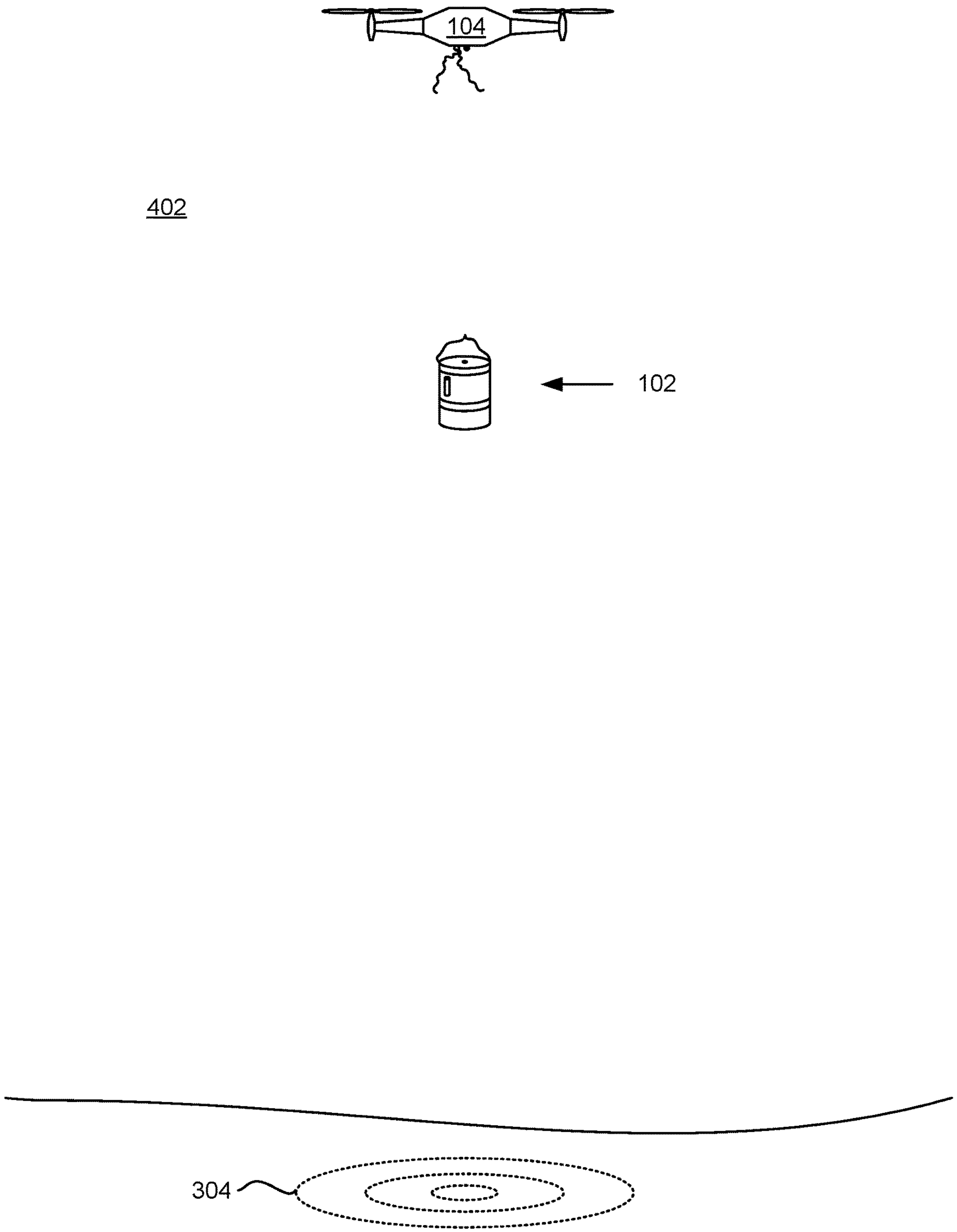

As shown in FIG. 4D, the tension in the connection between the detonator 110 and the unmanned vehicle 104 may cause the connection to sever. In turn, severing of this connection may trigger the detonator 110. The length of the connection may be such that the detonator 110 is triggered a period of time after the opening mechanism 108 is triggered. This may allow sufficient time for mixing of the active components inside the two-part explosive device 102. The length of the connection with the detonator 110 may be based on an initial height of the two-part explosive device 102 over the target 404 and a height above the target 404 where the two-part explosive device 102 explodes. The length of the connection may, in various implementations, further take into account an amount of time after the detonator 110 is triggered that it explodes and/or an amount of time after the detonator 110 that the combined active components explode in response.

As shown in FIG. 4E and discussed above, the two-part explosive device 102 may explode at a height above the target 404. For example, the target 404 may be an area of snowpack on a mountain. The two-part explosive device 102 may be used to trigger an avalanche, A concussive force of the explosion above the snowpack may jar the snowpack loose. In various other implementations, the two-part explosive device 102 may explode as it impacts the target 404. The two-part explosive device 102 may be set on the target 404 by the unmanned vehicle 104, and a thrust of the unmanned vehicle 104 may trigger detonation by severing the connections with the opening mechanism 108 and the detonator 110.

In some implementations, the opening mechanism 108 and/or the detonator 110 may not be physically connected to the unmanned vehicle 104. Instead, either or both may be electronically controlled. For example, the opening mechanism 108, detonator 110, and/or the unmanned vehicle 104 may include proximity sensors. The opening mechanism 108 and/or the detonator 110 may be triggered after the two-part explosive device 102 is released from the unmanned vehicle 104 at a pre-programmed distance from the unmanned vehicle 104. In other implementations, the opening mechanism 108 and/or the detonator 110 may be remotely triggered. For example, the unmanned vehicle 104 may set the two-part explosive device 102 on the target 404 and may be flown to a distance away from the target 404. After the unmanned vehicle 104 is a safe distance from the target 404, one or more trigger signals may be sent from a controller to the opening mechanism 108 and/or the detonator 110. The controller may send a first signal to trigger the opening mechanism 108 and a second, subsequent signal to trigger the detonator 110. The controller may send a single signal to a receiver on the two-part explosive device 102. The two-part explosive device 102 may include electronics and/or an onboard controller that first triggers the opening mechanism 108 and then, after a delay period, triggers the detonator 110.

Figure 5:
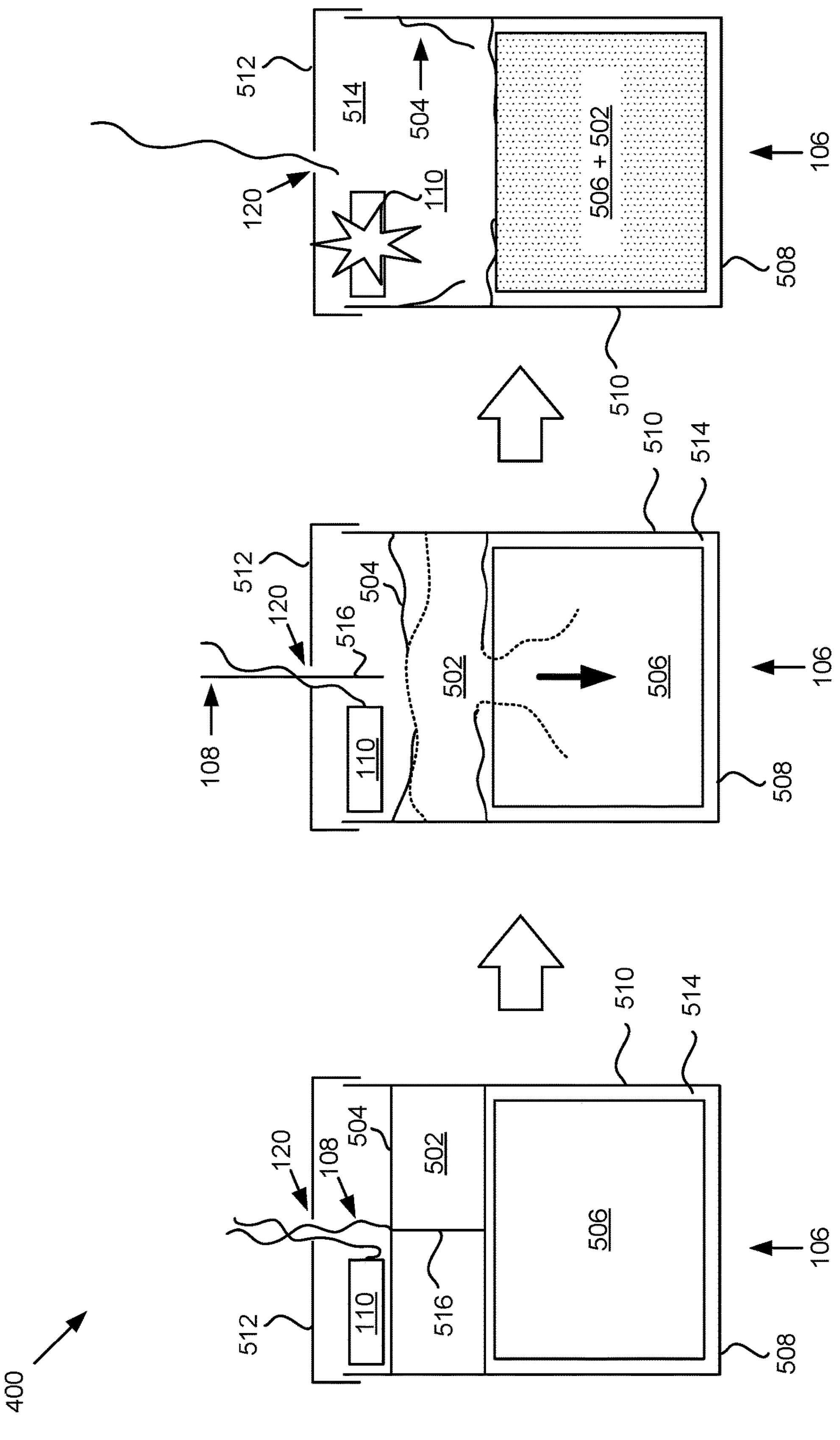
FIG. 5 illustrates a first detonation sequence for an implementation of the two-part explosive device.

FIG. 5 illustrates a first detonation sequence 500 for an implementation of the two-part explosive device 102. The two-part explosive device 102 may include the container 106, an unsensitized explosive 502 enclosed in a casing 504, a sensitizing agent 506 adjacent to the casing 504, the opening mechanism 108, and the detonator 110. In various implementations, the unsensitized explosive 502 may include a volume of nitromethane. The sensitizing agent 506 may include a volume of cellulose. In various other implementations, the active components of the two-part explosive device 102 may include liquid oxygen, lampblack, soot, naphthalene, wood meal, aluminum powder or sponge, ammonium nitrate, fuel oil, titanium powder or sponge, zirconium hydride, zirconium hydroxide, ammonium perchlorate, and/or nitroethane.

The container 106 may have a base 508, a wall 510, and a top 512. The container 106 may shaped to form an inner cavity 514 in which other components of the two-part explosive device 102 are contained. The container 106 may be cylindrical, spherical, cuboid, or may include any of a variety of other shapes. For example, the container 106 may be shaped to conform to the various shapes of the other elements of the two-part explosive device 102. The container 106 may include two or more cavities separated by interior walls. The container 106 may be made of one or more materials, such as a plastic or a biodegradable material like cardboard.

The casing 504 may be made of a thin, flexible polymer. The casing 504 may form a thin, flexible wall that defines an inner cavity containing the unsensitized explosive 502. In various implementations, the flexible wall of the casing 504 may have a thickness in a range of 0.5 mils to 5 mils. The casing 504 may have a thickness such that it is susceptible to puncture or tearing. In various implementations, the unsensitized explosive 502 may be pressurized within the casing 504, which may render the casing 504 more susceptible to rupture, puncture, or tearing. For example, the opening mechanism 108 may be a line wrapped around the casing 504. As the line rapidly constricts or tightens around the casing 504, such as due to the two-part explosive device 102 being released from the unmanned vehicle 104, the casing 504 may burst, exposing the unsensitized explosive 502 to the sensitizing agent 506.

The sensitizing agent 506 may include one or more sheets of cellulose, such as sheets of dried pulpwood. The sheets of dried pulpwood may have a thickness in range from 0.5 mils to 20 mils. For example, the sensitizing agent 506 may be a roll of single-ply, double-ply, or triple-ply toilet paper. In some implementations, a ratio of the volume of nitromethane to the volume of cellulose is in a range from 1:1 to 1:4.

In various implementations, the container 106 may be made of a biodegradable material, the unsensitized explosive 502 may be a volatile substance such as nitromethane, and the sensitizing agent 506 may be another biodegradable material such as cellulose. This implementation may improve the safety of the two-part explosive device 102. Should the two-part explosive device 102 fail to explode when deployed, the nitromethane with rapidly evaporate. After the nitromethane evaporates, the two-part explosive device 102 is no longer explosive, and can be safely retrieved and/or reused. When deployed in a hard-to-reach area, the two-part explosive device 102 can be left to biodegrade without having a substantial negative impact on the environment or individuals that may accidentally discover the device later.

In various implementations, a first portion or a first end of the opening mechanism 108 may be attached to the casing 504 such that, as a tension is applied to the string or cable, the string or cable causes the casing to tear or burst. In various other implementations, the casing 504 may include a pull-strip 516 and the opening mechanism 108 may include a line. The line may be attached to the pull-strip at one end and the unmanned vehicle 104 at the opposite end. As the two-part explosive device 102 is released and falls away from the unmanned vehicle 104, tension in the line may cause the pull-strip 516 to pull away from the casing 504, exposing the unsensitized explosive 502 to the sensitizing agent 506.

In some implementations, the casing 504 may be attached to an inside surface of the container 106. This may fix the casing 504 relative to the container 106 and may aid the opening mechanism 108 in opening the casing 504. For example, in implementations where the opening mechanism 108 includes a line wrapped around the casing 504, the attachment of the casing 504 to the container 106 may provide a competing force to the tension in the line. This may also prevent the casing 504 from being pulled inadvertently from the container 106.

Figure 6:
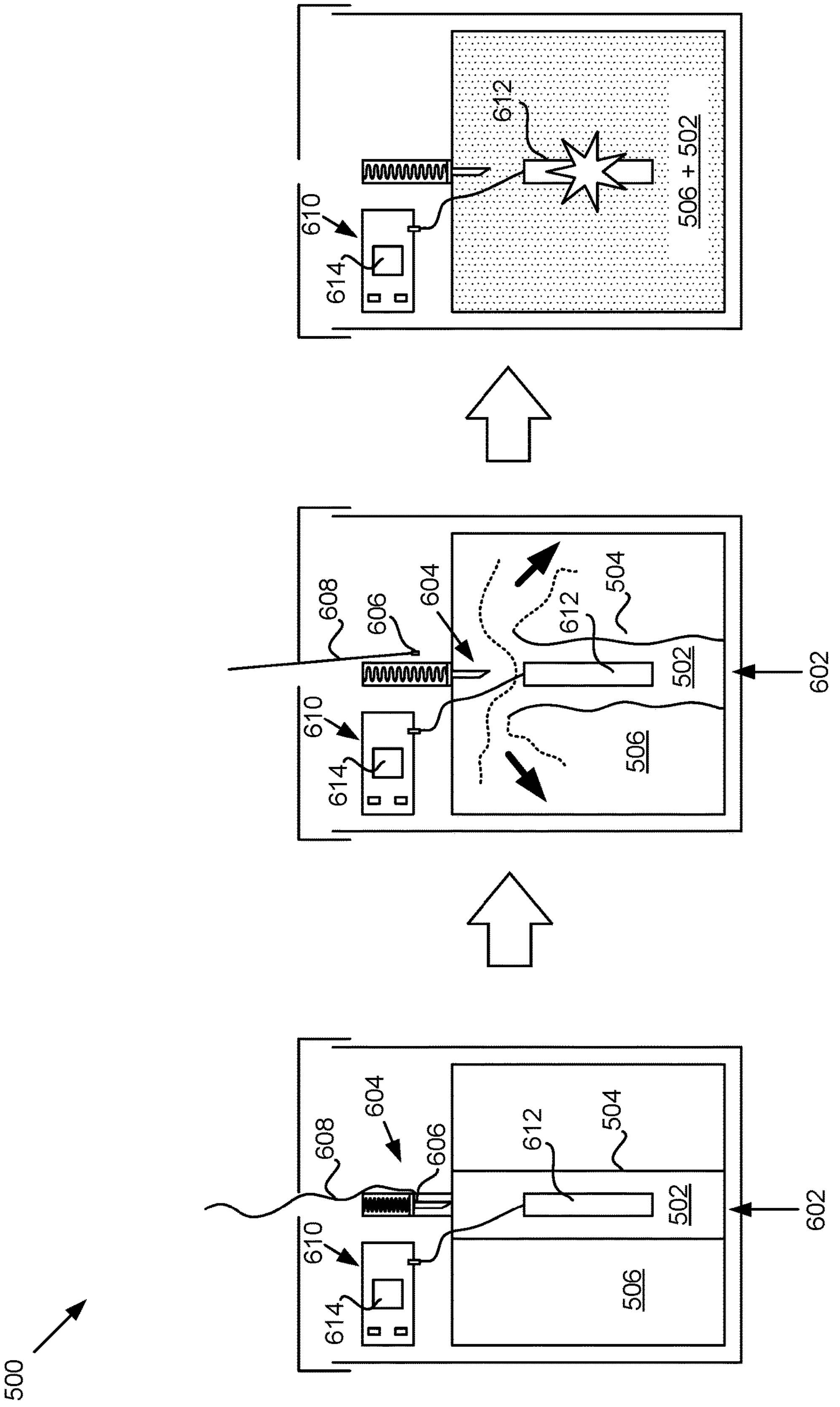
FIG. 6 illustrates a second detonation sequence for an implementation of the two-part explosive device where an unsensitized explosive is positioned within a sensitizing agent.

FIG. 6 illustrates a second detonation sequence 600 for an implementation of the two-part explosive device 102 where the unsensitized explosive 502 is positioned within the sensitizing agent 506. In various implementations, the sensitizing agent 506 may surround or partially surround the casing 504. For example, the sensitizing agent 506 may form a cylinder with a hollow center 602. The unsensitized explosive 502 and casing 504 may be positioned in the hollow center 602. In some implementations, the sensitizing agent 506 may be in a spherical shape or cuboid shape. The sensitizing agent 506 may partially surround the unsensitized explosive 502 and casing 504. For example, the sensitizing agent 506 may surround the unsensitized explosive 502 on right, left, front, and back sides, with the top and/or bottom sides remaining exposed to the inside of the container 106. The sensitizing agent 506 may entirely surround, e.g., enclose, the unsensitized explosive 502 and casing 504. This may ensure optimal absorption of the unsensitized explosive 502 by the sensitizing agent 506.

In various implementations, other components of the two-part explosive device 102 may also be positioned in or partially in the hollow center 602. For example, the detonator 110 may be positioned next to the unsensitized explosive 502 in the hollow center 602. The opening mechanism 108 may be partially positioned in the hollow center 602, such as when a line is wrapped around the casing 504 or attached to the pull-strip 516 of the casing 504.

The opening mechanism 108 may include a spring-loaded pin 604 positioned such that, as the spring-loaded pin 604 deploys, it punctures or cuts the casing 504. The spring-loaded pin 604 may be deployed in response to the container 106 being released from the unmanned vehicle 104. For example, a latch 606 on the spring-loaded pin 604 may be attached by a line 608 to the unmanned vehicle 104. As the two-part explosive device 102 falls, tension in the line 608 may pull the latch 606 from the spring-loaded pin 604, causing the spring-loaded pin 604 to puncture the casing 504.

In various implementations, the detonator 110 may include a delay mechanism 610. The delay mechanism 610 may delay activation of the detonator 110 for a set period of time, until the two-part explosive device 102 falls to a specified height above the target 404, and/or until the two-part explosive device 102 impacts with the target 404. For example, the detonator 110 may include a blasting cap 612 electronically coupled to the delay mechanism 610. The delay mechanism 610 may include a sensor 614. The delay mechanism 610 may include circuitry and/or a controller that sends an electric impulse to the blasting cap 612 in response to a signal detected from the sensor 614. The sensor 614 may, for example, be an accelerometer, barometer, or gyroscope.

Figure 7:
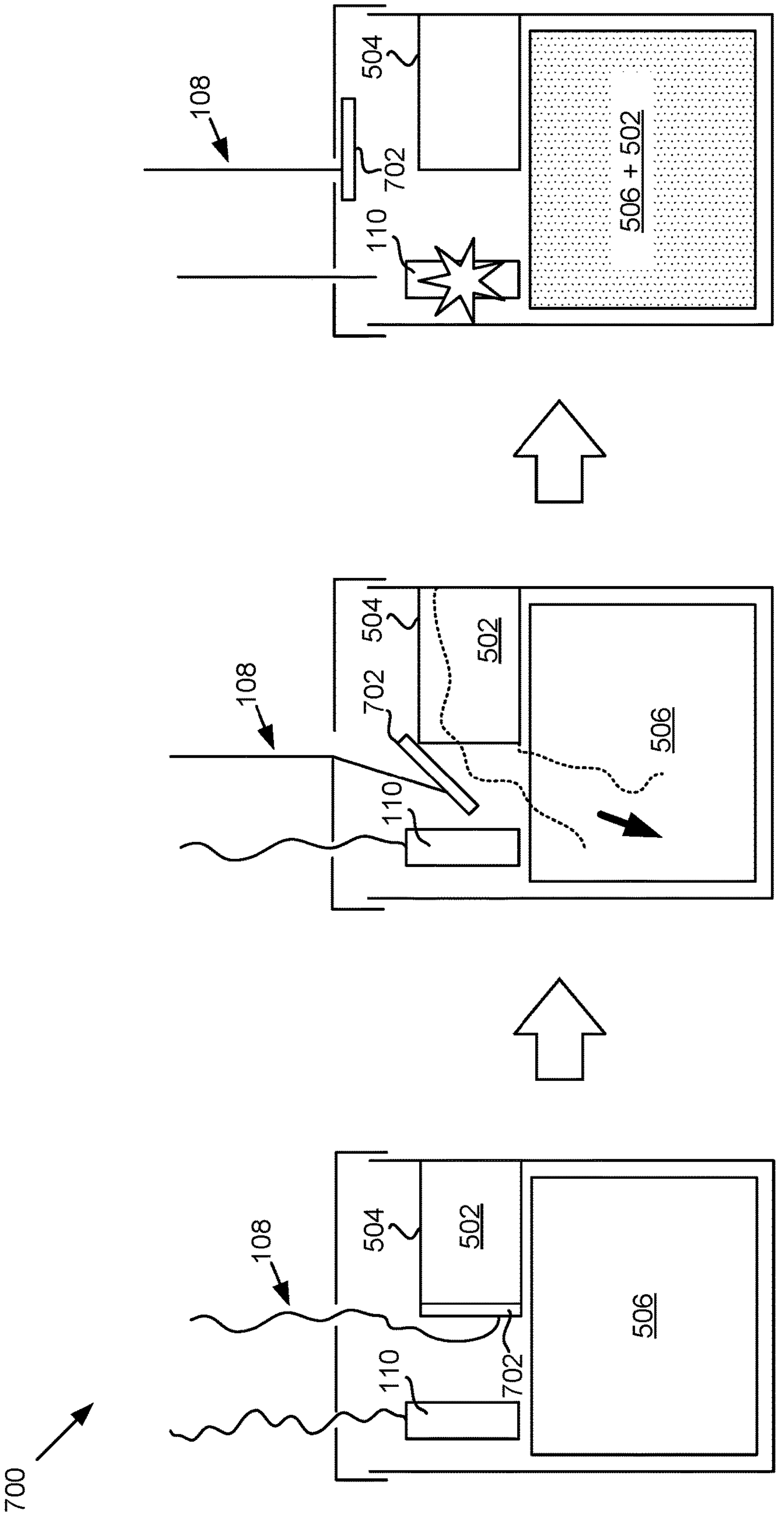
FIG. 7 illustrates a third detonation sequence for an implementation of the two-part explosive device where casing around the unsensitized explosive has a removable lid.

FIG. 7 illustrates a third detonation sequence 700 for an implementation of the two-part explosive device 102 where the casing 504 has a removable lid 702, which is attached to the opening mechanism 108. The opening mechanism 108 may include the line 608. The line 608 may be attached at one end to the removable lid 702 and at the opposite end to the unmanned vehicle 104. The line 608 may extend from inside the container 106 through the opening 120. As the two-part explosive device 102 falls away from the unmanned vehicle 104, tension in the line 608 may pull the removable lid 702 from the casing 504, causing the unsensitized explosive 502 to spill out onto the sensitizing agent 506.

Figure 8:
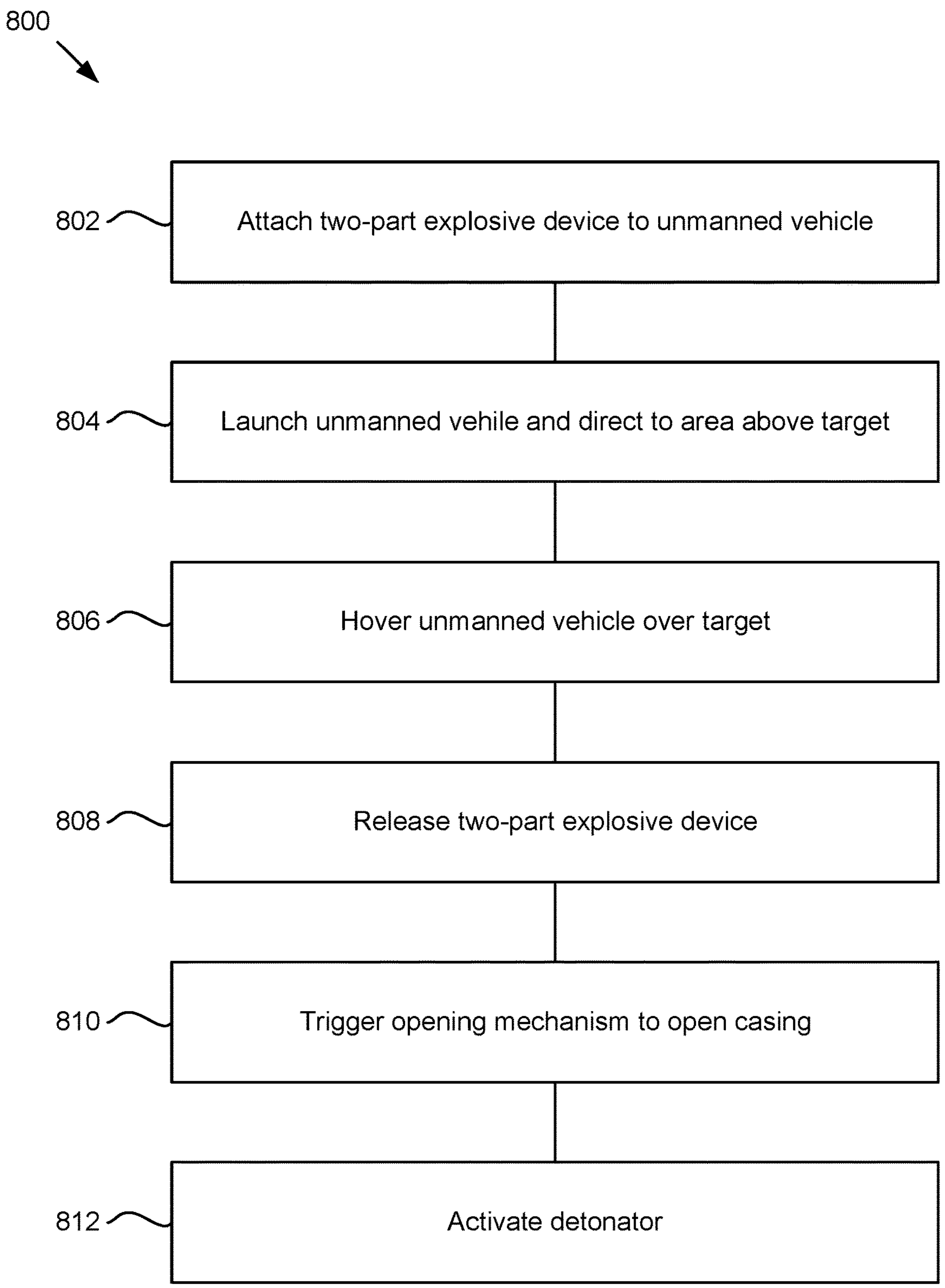
FIG. 8 illustrates an example method of delivering and combining the two-part explosive.

FIG. 8 illustrates an example method 800 of delivering and combining the two-part explosive device 102. The method 800 may include, at block 802, attaching a two-part explosive device (e.g., the two-part explosive device 102) to an unmanned vehicle (e.g., the unmanned vehicle 104). At block 804, the method 800 may include launching the unmanned vehicle and directing it, by remote control or automatically, to an area above a ground target (e.g., target 404). The method 800 may include, at block 806, hovering the unmanned vehicle over the ground target. In some implementations, the unmanned vehicle may be passed over the ground target instead of hovering. At block 808, the method 800 may include releasing the two-part explosive device from the unmanned vehicle. After releasing the two-part explosive device from the, the method 800 may include, at block 810, triggering an opening mechanism (e.g., opening mechanism 108) to expose an unsensitized explosive (e.g., unsensitized explosive 502) to a sensitizing agent (e.g., sensitizing agent 506). At block 812, the method 800 may include activating a detonator (e.g., detonator 110) after the unsensitized explosive is exposed to the sensitizing agent.

Figure 9:
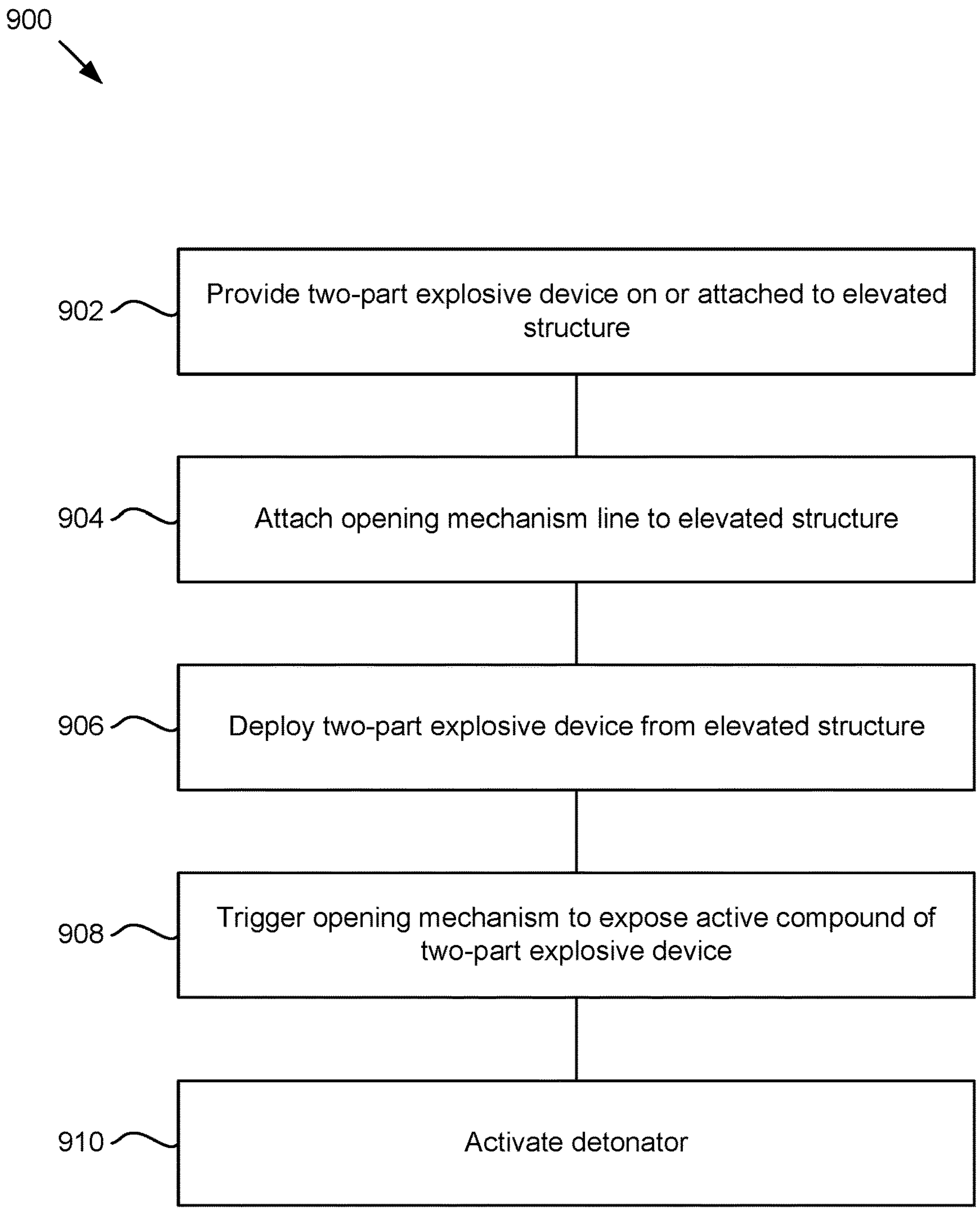
FIG. 9 illustrates an example method of deploying a two-part explosive device from an elevated structure.

FIG. 9 illustrates an example method of deploying a two-part explosive device (e.g., the two-part explosive device 102) from an elevated structure (e.g., the elevated structure 302). The method 900 may include, at block 902, providing the two-part explosive device and the elevated structure. The two-part explosive device may be attached to or otherwise supported on a form or surface, such as a platform or scaffold, that is elevated above a ground surface on which the elevated structure rests. The method may include, at block 904, attaching an opening mechanism of the two-part explosive device (e.g., the opening mechanism 108) to the elevated structure. For example, the opening mechanism may include a line, which may be tied to a platform or rail of the elevated structure.

At the block 906, the method 900 may include deploying the two-part explosive device from the elevated structure. For example, the two-part explosive device may be dropped from the elevated structure. The two-part explosive device may be thrown or launched from the elevated structure, such as by hand or using a launching device. The method 900 may include, at block 908, triggering the opening mechanism to expose the active compounds of the two-part explosive device to each other. This may occur automatically, such as due to momentum of the two-part explosive device from being launched from the elevated structure. At block 910, the method 900 may include activating a detonator of the two-part explosive device (e.g., the detonator 110).

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all the alternatively-inclusive elements. An example described using a list of alternatively-inclusive elements includes at least one element of the listed elements. However, an example described using a list of alternatively-inclusive elements does not preclude another example that includes all the listed elements. And an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower, or equal in scope to the original claims, are to be considered within the subject matter of the examples described herein.

We claim:

1. A system that delivers and combines a two-part explosive, comprising:
- an unmanned vehicle;
- a container that contains the two-part explosive, wherein:
  - the container is attached to, and releasable from, the unmanned vehicle; and
  - the two-part explosive comprises:
    - an unsensitized explosive in a casing that encloses the unsensitized explosive; and
    - a sensitizing agent adjacent to the casing;
  - an opening mechanism positioned at least partially within the container and adjacent to the casing, wherein the opening mechanism opens the casing and exposes the unsensitized explosive to the sensitizing agent in response to the container being released from the unmanned vehicle, the opening mechanism comprising a spring-loaded pin positioned such that, as the spring-loaded pin deploys it punctures or cuts the casing, wherein the spring-loaded pin is deployed in response to the container being released from the unmanned vehicle; and
  - a detonator inside or attached to the container, wherein the detonator triggers ignition of the two-part explosive after the unsensitized explosive is exposed to the sensitizing agent.

2. The system of claim 1, wherein:
- the unsensitized explosive comprises nitromethane; and
- the sensitizing agent comprises cellulose.

3. The system of claim 1, wherein the sensitizing agent surrounds the casing.

4. The system of claim 1, wherein:
- the sensitizing agent forms a cylinder with a hollow center; and
- the casing is positioned in the hollow center.

5. The system of claim 1, the opening mechanism comprising a line, wherein:
- a first portion or a first end of the line is attached to the casing such that, as a tension is applied to the line, the line causes the casing to tear or burst;
- the line extends from inside the container through an opening in the container and to the unmanned vehicle;
- a second end of the line is attached to the unmanned vehicle; and
- as the container is attached to the unmanned vehicle, there is slack in the line.

6. The system of claim 1, the casing further comprising a pull-strip, wherein:
- the opening mechanism comprises a line attached at a first end to the pull-strip;
- the line extends from inside the container through an opening in the container and to the unmanned vehicle;
- a second end of the line is attached to the unmanned vehicle; and
- as the container is attached to the unmanned vehicle, there is slack in the line.

7. The system of claim 1, the casing comprising a removable lid, wherein:
- the opening mechanism comprises a line attached to the removable lid;
- the line extends from inside the container through an opening in the container and to the unmanned vehicle;
- a second end of the line is attached to the unmanned vehicle; and
- as the container is attached to the unmanned vehicle, there is slack in the line.

8. The system of claim 1, the detonator comprising one or more of a chemical, mechanical, and electrical blasting cap.

9. The system of claim 1, the detonator comprising a fuse, wherein the fuse comprises one or more of a pyrotechnic fuse, an electric match, a slapper, and a bridge wire.

10. A device for combining a two-part explosive, comprising:
- a biodegradable container that contains the two-part explosive, the two-part explosive comprising:
  - nitromethane enclosed in a polymer casing;
  - cellulose at least partially surrounding the polymer casing;
  - a line attached to the polymer casing and extending from inside the biodegradable container to outside the biodegradable container, wherein the line is attached to the polymer casing such that a tensioning force applied to the line causes the polymer casing to tear or burst; and
  - a detonator inside or attached to the biodegradable container, wherein the detonator triggers ignition of the two-part explosive after the nitromethane is exposed to the cellulose;
- wherein the polymer casing is attached to an inside surface of the biodegradable container; and
- the line is wrapped around the polymer casing such that the tensioning force causes the line to tighten around the polymer casing.

11. The device of claim 10, wherein the line is attached at an end of the line outside the biodegradable container to an elevated structure that is elevated above a ground target.

12. The device of claim 10, the polymer casing comprising a flexible wall that defines an inner cavity, wherein the flexible wall has a thickness in a range of 0.5 mils to 5 mils.

13. The device of claim 10, wherein the cellulose comprises one or more sheets of dried pulpwood having a thickness in a range from 0.5 mils to 20 mils.

14. The device of claim 10, wherein a ratio of the nitromethane to the cellulose is in a range from 1:1 to 1:4.

15. The device of claim 10, wherein the sensitizing agent forms a cylinder with a hollow center; and the casing is positioned in the hollow center.

16. A method of delivering and combining a two-part explosive, comprising:

attaching a two-part explosive device to an unmanned aerial vehicle (UAV), wherein the two-part explosive device comprises:

a container that contains the two-part explosive, wherein:

the container is attached to, and releasable from, the UAV; and the two-part explosive comprises:

an unsensitized explosive enclosed in a casing; and a sensitizing agent adjacent to the casing;

an opening mechanism adjacent or attached to the casing, the opening mechanism comprising a spring-loaded pin positioned such that, as the spring-loaded pin deploys it punctures or cuts the casing, wherein the spring-loaded pin is deployed in response to the container being released from the unmanned vehicle; and a detonator inside or attached to the container;

launching the UAV and directing it, by remote control or automatically, to an area above a ground target;

hovering the UAV over the ground target;

releasing the two-part explosive device from the UAV;

after releasing the two-part explosive device from the UAV, triggering the opening mechanism to open the casing and expose the unsensitized explosive to the sensitizing agent; and activating the detonator after the unsensitized explosive is exposed to the sensitizing agent.

17. The method of claim 16, wherein releasing the two-part explosive device from the UAV automatically triggers the opening mechanism.

18. The method of claim 16, wherein:

the detonator comprises a delay mechanism; and the delay mechanism is activated after releasing the two-part explosive device from the UAV.

19. The method of claim 16, wherein:

the detonator comprises a delay mechanism; and the delay mechanism delays activation of the detonator:

for a set period of time;

until the two-part explosive device falls to a specified height above the ground target; or until the two-part explosive device impacts with the ground target.

20. The method of claim 16, wherein the unsensitized explosive comprises nitromethane; and the sensitizing agent comprises cellulose.

* * * * *